United States Patent [19]

Gumm et al.

[11] Patent Number: 5,233,418
[45] Date of Patent: Aug. 3, 1993

[54] CATV SWEEP SYSTEM USING A GATED RECEIVER

[75] Inventors: Linley F. Gumm; Richard T. King, both of Beaverton, Oreg.

[73] Assignee: Tektronix, Inc., Wilsonville, Oreg.

[21] Appl. No.: 783,012

[22] Filed: Oct. 25, 1991

[51] Int. Cl.[5] ........................................... H04N 17/00
[52] U.S. Cl. ..................................... 358/139; 358/10; 358/86; 358/145; 358/21 V; 455/3.1; 455/67.4
[58] Field of Search ............... 358/139, 10, 86, 147, 358/145, 154, 21 V; 455/3, 4, 5, 6, 67, 115, 226

[56] References Cited

U.S. PATENT DOCUMENTS

| | | | |
|---|---|---|---|
| 2,885,470 | 5/1959 | Bartelink | 358/139 |
| 4,038,600 | 7/1977 | Thomas | 358/139 |
| 4,207,431 | 6/1980 | McVoy | 179/1 |
| 4,240,100 | 12/1980 | Gorbold et al. | 358/10 |
| 4,390,900 | 6/1983 | VanKampen et al. | 358/147 |
| 4,408,227 | 10/1983 | Bradley | 358/139 |
| 4,479,146 | 10/1984 | Cohn | 358/147 |
| 4,511,920 | 4/1985 | Iijima et al. | 358/139 |
| 4,641,189 | 2/1987 | Warrick | 358/154 |
| 4,685,065 | 8/1987 | Braun et al. | 364/485 |
| 4,700,222 | 10/1987 | Large | 358/86 |
| 4,710,969 | 12/1987 | Fluck et al. | 455/67 |

OTHER PUBLICATIONS

TEK User's Manual, Part, No. 070-7789-01, Product Group 2F. "2721/2722 Non-Interfering Sweep System" Latest Revision Jan. 1991.

*Primary Examiner*—John L. Peng
*Assistant Examiner*—Sherrie Hsia
*Attorney, Agent, or Firm*—Francis I. Gray

[57] ABSTRACT

A non-interference method of determining the frequency characteristics of a cable television (CATV) system adds an RF test pulse to an RF video signal in the vertical interval between equalizer pulses. A gated receiver coupled to the distribution system receives the RF video signal only during the vertical interval and extracts the envelope of the RF test pulse, with the sync pulses being attenuated. RF pulses of different frequencies within each channel of the CATV system are used to determine the frequency characteristics of each channel.

4 Claims, 2 Drawing Sheets

CATV SWEEP SYSTEM USING A GATED RECEIVER

BACKGROUND OF THE INVENTION

The present invention relates to measurement and analysis of cable television (CATV) systems on a non-interfering basis, and more particularly to a CATV sweep system using a gated receiver for measuring the frequency characteristics of each channel of the CATV system in response to a radio frequency (RF) pulse inserted into the video signal during a spectrally dead period, the RF pulse having an amplitude that does not produce interference.

Broadband cable television (CATV) systems typically include active class-A broadband amplifiers and passive connectors, splitters and taps, all interconnected by a significant amount of coaxial cable. The majority of these components are in outside locations, exposed to temperature and weather extremes. Proper performance of such a CATV system is critical for customer satisfaction and continued regulatory compliance, and is affected by these extremes. Therefore the frequency response of the system, including all passive and active components, is important.

A common approach to determining frequency response is to inject a test signal at the headend of the CATV system. The test signal sweeps across the entire system bandwidth. Simultaneously the signal amplitude is measured at various points along the system to determine system gain and flatness. The difficulty with this approach lies not in actually performing the measurement, but rather in performing it while the system is operating without degrading the video signals being transmitted on the system. Historically high level, low level, intermediate level, and even "sweepless" sweep approaches have been tried. All these approaches suffer from various shortcomings including:
interference with cable signals;
insufficient "sweep-to-noise" after several amplifiers;
delayed response leading to "rubber screwdriver" effect; and
too few data points across the system bandwidth.

One solution, incorporated in the 2721/2722 Non-Interfering Sweep System manufactured by Tektronix, Inc. of Beaverton, Oreg., United States of America, is to transmit short test pulses, approximately 8 microseconds in duration, during the vertical blanking interval of the video signals being carried by the CATV system. Since there is no video information transmitted during the vertical blanking interval, the picture quality theoretically is unaffected. The test pulse amplitude is set close to that of the system carriers, such as 6 dB down from the horizontal sync tip amplitude, so the pulses do not get lost in system noise. The measured amplitudes of these pulses are compiled to show the frequency response of the CATV system.

Once the measuring signal, which is generally an RF pulse, is inserted into the vertical interval, the question becomes one of determining an appropriate amplitude so the sweeper is truly non-interfering. If the amplitude of the RF pulse is set too large, it causes interference in the sound channel of the customer's set that sounds like ignition noise. On the other hand if the amplitude is set too small, the measured results have uncertainties caused by interference from the video signal in the channel being measured.

The mechanism of sound channel interference is fairly straight forward. When the customer's set receives a video signal together with the RF pulse, it treats the RF pulse as if it were part of the video signal. For example, if the RF pulse is 1.0 MHz higher in frequency than the channel picture carrier, then during the time that the RF pulse is "on" the receiver treats the video signal as if a 1.0 MHz sine wave were superimposed upon it. If the amplitude of the RF pulse with respect to the video signal is such that the sum of the two signals exceeds either the sync-tip or peak white values of the video signal, then the receiver's standards have been exceeded. When the standards are exceeded, some sets exhibit interference effects. These effects may be noticed as a buzz that accompanies video that exceeds peak white. In the case of very short pulses, such as the RF pulse, the buzz is reduced to a "pop." However since the RF pulse is transmitted while the video is at blanking level, it takes a much smaller pulse amplitude to exceed sync tip amplitude than it takes to exceed peak white.

The problem with sending a signal that exceeds sync tip amplitude is the compression and distortion it causes in the customer's receiver. There are no guarantees of how much extra amplitude over the sync tip level the receiver's IF output stage can handle. The receiver's AGC loop always adjusts the video signal in the IF stage to be at or near the maximum amplitude that this amplifier can handle. If the video signal plus the RF pulse causes the amplifier to compress, it causes the instantaneous amplitude of the 4.5 MHz IF sound intercarrier signal to decrease below the limiter's input threshold, causing a short term sound drop out, i.e., "pop", very similar in cause to the buzz caused by high video modulation. If the frequency of the pulse is such that the difference between it and the picture carrier is a sub-multiple of the 4.5 MHz sound inter-carrier spacing, the distortion caused by the RF pulse causing compression in the amplifier produces a harmonic that falls near the sound carrier, possibly also causing a pop.

Thus the RF pulse amplitude should be low enough so that receiver system standards are not violated. Assume that a TV modulator is transmitting blanking such as during the vertical interval between equalizing pulses. The amplitude of blanking is 75% of sync tip amplitude. Adding a 500 kHz sine wave signal to the video waveform and adjusting its amplitude so that the peak amplitude is just equal to 100% of sync amplitude, as shown in FIG. 1, results in each sideband of the sine wave being 12.5%. The total envelope amplitude of the video signal is the instantaneous sum of the three vectors shown. When the three vectors are aligned, they add to 100%. Thus each sideband is 18 dB below sync tip amplitude as opposed to the 6 dB of the 2721/2 Non-interfering Sweep System. This is the maximum amplitude that the RF pulse can be without exceeding receiver system standards.

To determine the amplitude to which the test pulse can be lowered, certain factors have to be considered. For example the test pulse must be larger than the specific amplitude of various portions of the video signal. The 2721/2 Non-interfering Sweep System places the RF pulse in a spectrally dead period between equalizing pulses, as indicated above. A VITS multiburst test signal generates a 100 IRE peak-to-peak sine wave similar to that caused by the RF pulse. An analysis similar to that of FIG. 1 shows that the multiburst signal causes a spectral component 16 dB below sync tip. The test pulse must be at least 2 dB above this amplitude so that an unequivocal peak measurement of the pulse can be made. Therefore the pulse amplitude can be set to a minimum of 14 dB below sync tip without allowing any tolerancing for amplitude variations in the CATV system. However this is 4 dB above the guaranteed non-interfering amplitude. Narrowing the receiver bandwidth also helps some, reducing spectral clutter by about 5 dB. But such a narrowing of bandwidth requires a longer pulse. Even with the lower bandwidth the RF pulse amplitude cannot be lowered below the minimum of 18 dB below sync tip to guarantee a non-interfering sweep. As indicated above the RF pulse amplitude generated by the Tektronix CATV Sweeper System is 6 dB below sync tip amplitude.

Another attempted solution to the problem of CATV system testing on a non-interfering basis is disclosed in U.S. Pat. No. 4,408,227 issued to Bradley on Oct. 4, 1983 entitled "Method and Apparatus for Television Distribution System Sweep Testing." The Bradley system uses time division multiplexing between the test signal and the video signal as a means of eliminating interference to the video signal due to testing. The video signal provides synchronizing signals that enable the video signal to be suppressed during the vertical interval and the test signal to be inserted in its place. At the receiver the process is reversed to demultiplex out the test signal for display. However, the Bradley system causes a loud buzz on the customer's receiver due to dropping the sound carrier when the test signal is multiplexed with the video signal. This is similar to the buzz caused by excess peak-white modulation mentioned above.

What is desired is a CATV sweep receiver for measuring test signals in the video signal that allow the amplitude of the pulse signal to be less than a threshold value that guarantees non-interference on a customer's receiver.

SUMMARY OF THE INVENTION

Accordingly the present invention provides a CATV sweep system using a gated receiver for measuring CATV performance with low amplitude RF pulses inserted into a video signal. The RF pulses have an amplitude below a non-interference threshold to guarantee non-interference with a customer's receiver. A transmitter generates an RF pulse having an amplitude less than the threshold amplitude which is added to the video signal during a spectrally dead period, such as during the vertical interval between the equalizing pulses. A gated receiver limits the time during which the receiver looks for the RF pulse to the spectrally dead period at the frequency to which the receiver is tuned. The timing control for the gate is either transmitted to the gated receiver through a data channel or is derived by the receiver from the video signal.

The objects, advantages and other novel features of the present invention are apparent from the following detailed description when read in conjunction with the appended claims and attached drawing.

DESCRIPTION OF THE PREFERRED EMBODIMENT

Figure 1:
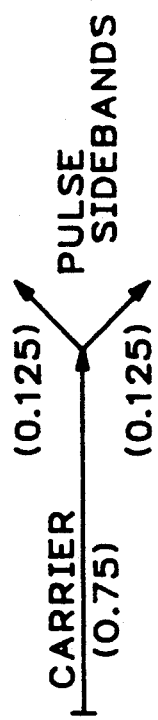
FIG. 1 is a vector diagram for determining the maximum RF pulse amplitude to guarantee non-interference according to the present invention.
Figure 4:
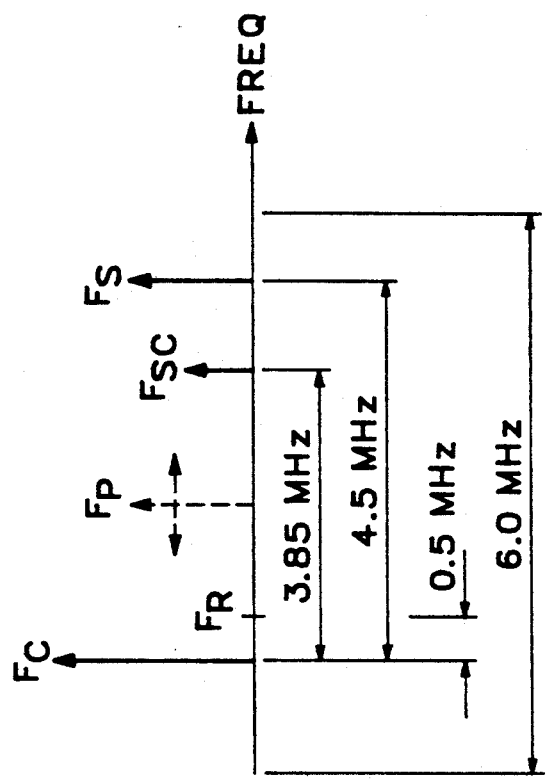
FIG. 4 is a frequency spectrum for a CATV system channel to illustrate the operation of the CATV sweeper system according to the present invention.
Figure 3:
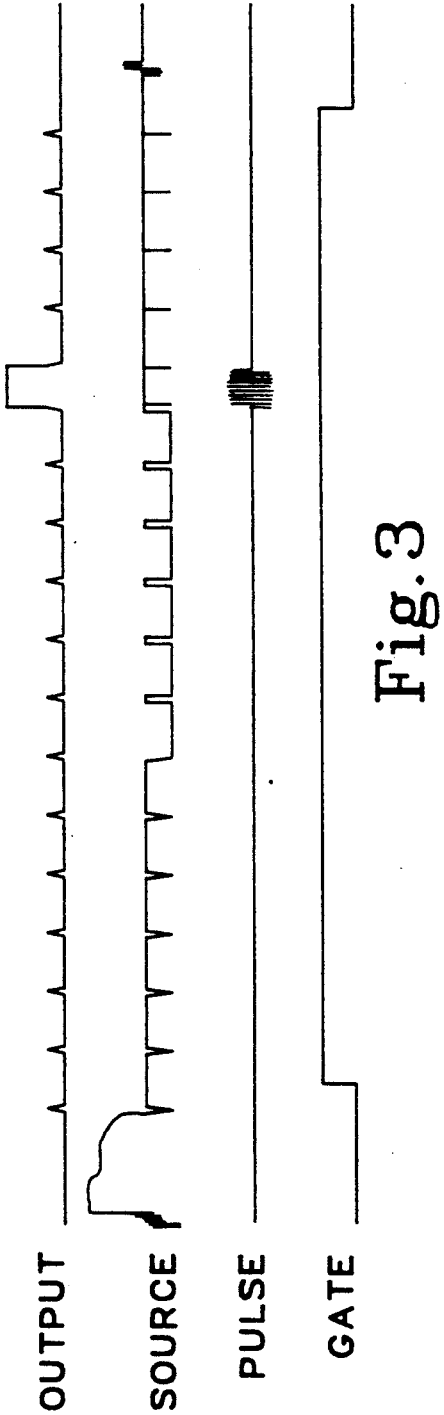
FIG. 3 is a waveform diagram to illustrate the operation of the CATV sweeper system according to the present invention.
Figure 2:
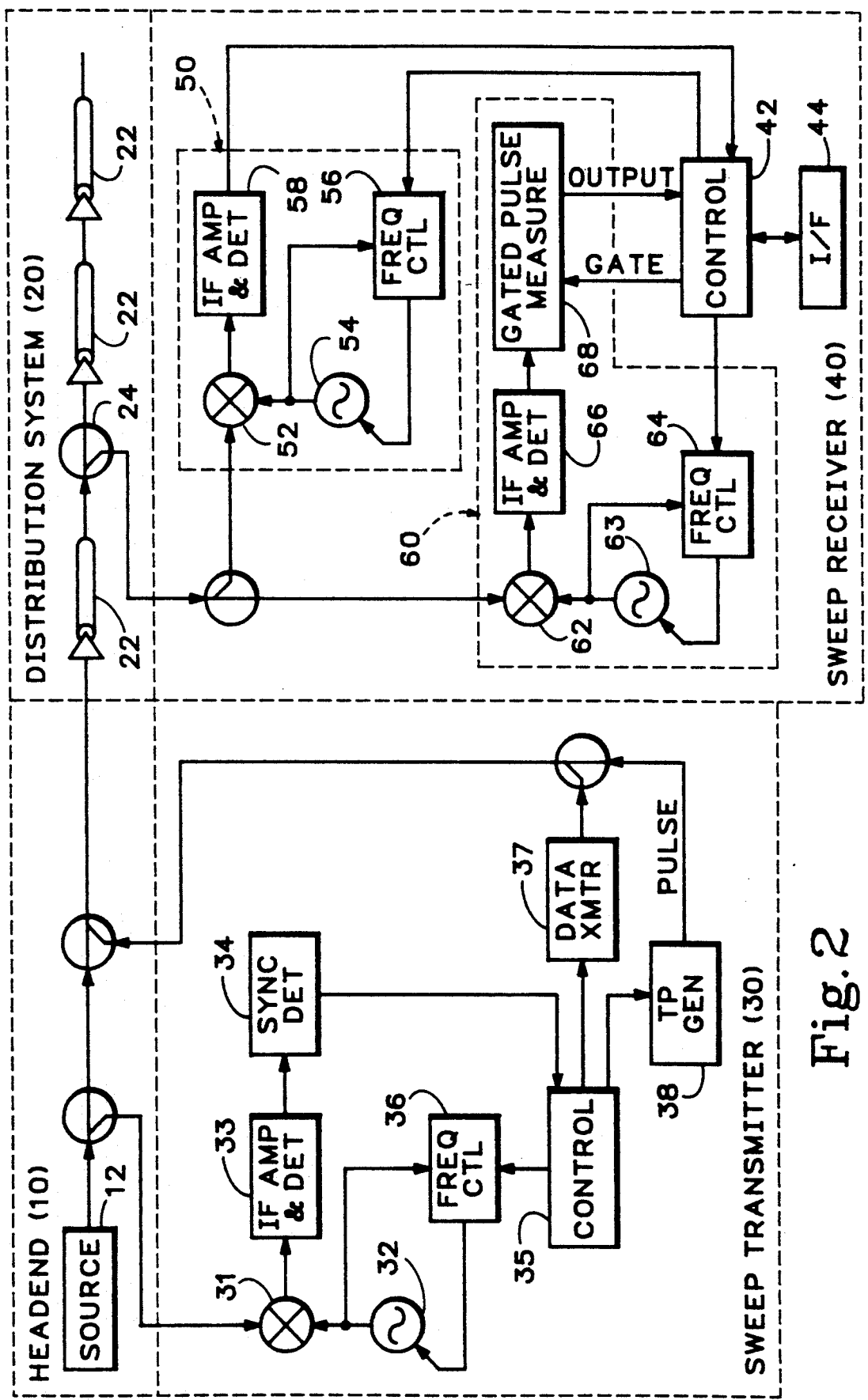
FIG. 2 is a block diagram of a CATV sweeper system according to the present invention.

Referring now to FIG. 2 a cable television (CATV) headend 10 includes a video RF source 12 that includes all the video channels for a CATV system. Each video channel has a unique carrier frequency Fc with upper sidebands for the color subcarrier Fsc and the sound inter-carrier Fs, as shown in FIG. 4. The output of the source 12 is coupled to a distribution system 20 made up of cables and amplifiers 22 with drop, or test, points 24 along the system.

A sweep transmitter 30 is coupled to receive the RF video signal from the source 12. The RF video signal is input to a mixer 31. A frequency from a local oscillator 32 is mixed with the RF video signal to select one of the video channels. The selected channel from the mixer 31 is input to an intermediate frequency (IF) amplifier and detector circuit 33 to recover the video signal. The output from the IF amplifier and detector circuit 33 is input to a sync detector circuit 34 that outputs the sync signal from the video channel to a control processor 35. The sync signal provides timing for the sweep transmitter 30. The control processor 35 provides a channel select signal to a frequency control circuit 36. The frequency control circuit 36 determines the frequency, and thus the selected channel, for the local oscillator 32.

The control processor 35 generates control signals from the sync signal for a data transmitter circuit 37 and a test pulse generator circuit 38. The data transmitter circuit 37 typically is a frequency shift key (FSK) modulator that transmits serial binary data in response to a pulsewidth modulated control signal from the control processor 35. The transmitted data may include timing data. The test pulse generator 38 generates an RF test pulse in response to a gate signal from the control processor 35. The RF test pulse is timed to occur between equalizing pulses within the vertical interval of the video channel. The amplitude of the RF test pulse is equal to or less than the maximum level that does not create interference in the sound channel, i.e., 18-22 dB below horizontal sync tip. The frequency of the RF test pulse is selected to fall within the frequency band of the selected video channel. The RF test pulse and the transmitted data are combined and added to the RF video signal from the headend source 12.

At a drop, or test, point 24 in the distribution system 20 the RF video signal is coupled to a sweep receiver 40. The RF video signal is input to a data recovery receiver 50 and to a gated receiver 60. Both receivers 50, 60 are controlled and interact with a receiver control processor 42. An operator interacts with the sweep receiver 40 via an interface circuit 44 that may include a keyboard and a display device. A first receiver mixer 52 for the data receiver 50 mixes the RF video signal with the frequency from a first local oscillator 54. The frequency of the first local oscillator 54 is determined by a first frequency control circuit 56 in response to a channel select signal from the receiver controller 42. A first IF amplifier and detector circuit 58 recovers the data from the down-converted RF video signal, and forwards the data to the receiver controller 42. In this embodiment the receiver controller 42 uses the data to control and provide timing for the gated receiver 60 as well as to select the proper channel.

The gated receiver 60 includes a second mixer 62, a second local oscillator 63 and a second frequency control circuit 64 coupled together and under control of the receiver controller 42 just like for the data receiver 50. The output of the second mixer 62 is input to a second IF amplifier and detector circuit 66. The output of the second IF amplifier and detector circuit 66 is then input to a gated pulse measurement circuit 68. The gated pulse measurement circuit 68 is only operational during a gate signal received from the receiver controller 42 in response to timing signals extracted from the data from the data receiver 50.

The duration of the gate signal includes the vertical interval within which the RF test pulse is located. By using this spectrally dead period to make measurements of the RF test pulse, the gate timing with respect to the RF pulse timing is not critical. The gated pulse measurement circuit 68 provides an output, together with the sync and equalizing pulses significantly attenuated, of the RF pulse envelope. Alternatively, the timing the gate signal may be derived from the RF video signal as in the sweep transmitter 30. Also the gating may occur anywhere in the receive path, such as at the IF stage before the detector or even before the RF input to the mixer 62.

In operation an operator either manually selects a video channel from the RF video signal to be tested, or selects an automatic mode where each video channel is tested in turn. The sweep transmitter 30 is tuned to the selected video channel and,inserts the RF test pulse signal into an interval between equalizing pulses within the vertical interval. The frequency $F_p$ of the RF test pulse is within the frequency range of the selected channel. The sweep receiver 40 is tuned to the same frequency plus an offset, i.e., to a receiver frequency Fr slightly above the channel carrier frequency Fc. An output for that channel is obtained by the gated receiver 60. Then the RF test pulse frequency $F_p$ may be stepped to another frequency within the selected video channel frequency band to repeat the process. After one or more RF test pulses at different frequencies have been transmitted, the control processor 35 changes the channel select signal to the frequency control circuit 36 to step to the next channel for testing. The amplitudes of the RF test pulses within a given video channel provide a frequency response characteristic of the cable TV system for that channel.

When the gated receiver 60 has a 300 kHz bandwidth, the gate signal is limited to the vertical interval where there are no spectral components other than sync edges, and the RF test pulse is timed to have five microsecond clearances after and before equalizing pulse edges. If these conditions are met, the RF test pulse can have an amplitude more than 30 dB below sync tip amplitude and still have less than 0.1 dB measurement error because of the presence of other spectral components. Therefore the amplitude of the RF test pulse may be between 18-30 dB below sync tip and still assure interference free performance with great accuracy. The clearances with the equalizing pulses assure that the various signals in the IF filter of the IF amplifier and detector circuit 66 have time to decay before the next signal arrives. This prevents a beat note on either edge of the RF test pulse which would cause a measurement error.

Thus the present invention provides a CATV system using a gated receiver that is truly non-interfering by placing an RF test pulse in a "spectrally dead" period of a video signal so that the amplitude of the RF test pulse may be so small as to be virtually undetectable with normal techniques.

What is claimed is:

1. A cable television measurement system comprising:
    means for inserting an RF test pulse into a spectrally dead period of a video signal between equalizing pulses, the amplitude of the RF test pulse being less than a non-interference threshold and the width of the RF test pulse being less than an interval
    means for processing the video signal only during the spectrally dead period to recover the RF test pulse.

2. A cable television measurement system as recited in claim 1 wherein the processing means comprises:
    a receiver having as an input the video signal including the RF test pulse;
    means for generating a gate signal falls within the spectrally dead period and spans the interval encompassing the RF test pulse; and
    means for detecting and measuring the RF test pulse during the period defined by the gate signal.

3. A cable television measurement system as recited in claim 2 wherein the generating means comprises:
    means for transmitting with the video signal a timing information signal; and
    means at the receiver for extracting the timing information signal from the video signal to produce the gate signal.

4. A cable television measurement system as recited in claim 2 wherein the generating means comprises means for extracting timing information from the video signal and producing the gate signal.

* * * * *